United States Patent Office 2,929,790
Patented Mar. 22, 1960

2,929,790

PROCESS OF CONCENTRATING AQUEOUS SILICA SOLS

Raymond Reuter, Orland Park, and Alfred J. Tozyldo, Chicago, Ill., assignors to Nalco Chemical Company, Chicago, Ill., a corporation of Delaware No Drawing. Application December 7, 1955
Serial No. 551,529

2 Claims. (Cl. 252—313)

The present invention relates to a process for concentrating aqueous silica sols. More particularly, it relates to a more simplified method of concentrating aqueous silica sols than has been heretofore known.

Aqueous colloidal silica sols have been known for a number of years and have been the subject of extensive scientific investigation. These sols are generally prepared by removing all but a small portion of the alkali metal present in water glass to produce a colloidal system of what might be described as polymeric silicic acid.

One method of preparing such sols is to neutralize water glass with a mineral acid. In using this method of forming silica sols it is necessary to remove the major portion of the salts formed by the neutralization reaction. This may be accomplished by dialysis or electrodialysis but these procedures are not well adapted to large scale economical production.

An improved method for conveniently preparing silica sols has been described in Bird U.S. Patent 2,244,325. According to the Bird method a water glass (alkaline silicate solution) is passed through a column of cation exchange material in the hydrogen form whereby the alkali metal of the water glass is exchanged for hydrogen and the resultant product is a silica sol of unusual purity. In using the Bird process, as well as the other methods of producing silica sols, it has generally been deemed necessary to have an alkali metal ion present in the colloidal silicic acid so that the produced sol exhibits stability against gelation.

One general disadvantage, ascribed to the various prior art methods of producing silica sols, is that they are produced as relatively dilute solutions. To be suitable for most commercial purposes it is necessary to concentrate these sols whereby more concentrated colloidal silica is obtained. In the Bird patent, it is shown that the sols produced thereby may be conveniently concentrated by evaporation to silica concentrations as high as 15% silica. More recently, Bechtold, et al., U.S. Patent 2,574,902 has disclosed that silica sols, such as are produced according to the Bird method, may be concentrated by first taking a portion of an alkali stabilized sol, heating it to about the boiling point, and then adding to this sol further portions of alkali stabilized sol until silica concentrations as high as 35% are produced. While Bechtold et al. show a commercially practicable method for concentrating silica sols, nevertheless, there are several disadvantages in using this process as will be hereinafter shown.

It may be assumed that colloidal silicic acid such as produced by the Bird process in concentrations of between 2% to 3.5% by weight silica in water contain units of colloidal silica having a plurality of functional OH groups. These functional groups, being extremely reactive, tend to form linkages with each other and in time will produce a three-dimensional cross-linked polymer which results in gel formation. If, however, at the time the sol is produced, a small amount of alkali metal ion is added to the sol in a ratio of $SiO_2$ to $Na_2O$ of about 10:1 through 100:1, the alkali metal ion will tend to combine with a number of the functional OH groups whereby the hydrogen ion is replaced. This process reduces the polymer-forming tendencies of the sol. In this state the colloidal silicic acid sols are stable for an indefinite period of time against gelation.

With the stabilized silicic acid sols, it has been found that a process ensues, either under storage conditions or where the temperature of the stabilized sols are elevated to about the boiling point, which causes an increase in the density of the sol particles. This phenomenon is most strikingly noticed by closely observing the pH of a freshly produced alkali stabilized sol and comparing it with the pH of a stored or heated sol. For instance, if a 3.5% $SiO_2$ sol is treated with sodium hydroxide, to give the sol a finished pH of about 9.0, storage at room temperature (70°±5° F.) for a period of several weeks will tend to produce a sol having a pH of about 10.0 or greater. In a similar instance if the sol is heated to say about its boiling point, the pH change indicated will occur more rapidly.

If the increase in pH of the stored sol can be predicated upon particle growth then it becomes evident that the colloidal silica initially present in the sol has agglomerated itself into larger colloidal units than were originally present. In any event, it appears that the colloidal silica undergoes reactions whereby larger particles are formed. This increase in particle size decreases the number of surface OH groups available for combination with stabilizing amounts of alkali metal ion.

As the colloidal silicic acid particles begin to grow the alkali metal cations which are attached to the silica through oxygen linkages tend to become dissociated in aqueous media which readily accounts for the increase in pH. When the pH is increased by the release of free cations into the solution it is believed that the colloidal silicic acid particles are joined or merged into one another in a form of small multiplaned lattices which cause the original particles present to form independent micelles of increased size.

If, for instance, a colloidal silicic acid sol containing 3.0% silica is adjusted with sodium hydroxide to an $SiO_2:Na_2O$ weight ratio of 70:1 and such a sol is used as a starting sol and built up by a process of concentration as shown in U.S. Patent 2,574,902 to say 30 to 35% $SiO_2$, the weight ratio of $SiO_2$ to $Na_2O$ remains constant during the concentration and the produced sol contains relatively large amounts of free alkali metal ion, giving the finished sol a pH of 11 or higher and particles of increased size as compared with the original sol particles. Such a sol leaves much to be desired for use in many commercial operations. If, however, a sol of the type described were used as a starting material and were concentrated under conditions such that the silica to alkali metal ratio were adjusted to an amount larger than was originally present, the resulting sol would contain an amount of alkali metal ion sufficient only to combine with the number of free OH groups necessary to impart stability to the sol.

With the foregoing desideratum in mind, it is an object of the present invention to produce concentrated silica sols having a high degree of stability under conditions of heat and storage by a process wherein the alkali metal content of the colloidal silicic acid sol is so controlled during concentration of the sol that the finished sol has an $SiO_2:Na_2O$ ratio more than that of the sol originally used as a starting material.

Another object is to provide a simple and direct method of producing concentrated stable silica sols.

Still another object is to provide a new and improved method of producing highly concentrated stable colloidal silica sols.

A further object is to provide a more economical and convenient way of preparing colloidal silica sols than has been heretofore known. Other objects will appear hereinafter.

According to the invention, an alkaline silica sol is concentrated under conditions whereby the pH of the sol is being reduced while the concentration of $SiO_2$ therein is being increased by adding an acid silica sol during the concentration.

In the preferred practice of the invention, an alkali stabilized silica sol containing from about 3.5% to 7% silica, as $SiO_2$, and an $SiO_2:Na_2O$ ratio of 50:1 to 130:1, is concentrated while adding thereto an acid silica sol in an amount sufficient to produce a silica sol containing 18% to 48% by weight $SiO_2$, and having a pH between 8 and 11.

In the first stage of the concentration, the initial sol can be evaporated while allowing the pH of the evaporated sol to increase with consequent growth in particle size. It is generally preferable, however, not to permit the pH to exceed about 10 in this first stage. A freshly prepared silicic acid sol having a pH within the range of 2 to 5.5 is then preferably added and the evaporation continued. The additions of the acid sol and subsequent evaporation can be carried out continuously or intermittently, but it is preferable to maintain a substantially constant volume. By using a colloidal silicic acid containing no free alkali as a means of providing silica, it has been found that silica sols having a storage life of as long as say one year or more can be produced. A greater advantage is that the silica sols are more readily produced. Furthermore, the process provides for the production of silica sols under more controlled conditions which make it possible not only to control the particle size but also to increase the $SiO_2$ concentration of the resultant sol.

In the practice of the invention, a silicic acid sol can be made by any well known method. It is preferred, however, to use the method disclosed in Bird U.S. Patent 2,244,325. As a starting alkali metal silicate material it is desirable to use only those silicates having the highest possible amount of silica in relation to alkali metal. Numerous brands of sodium silicate with varying ratios of $SiO_2:Na_2O$ are available. The most economical and convenient to use is that which contains an $SiO_2:Na_2O$ ratio of about 3.22 to 1. The material as supplied is too concentrated for passage through a cation exchange resin column and it is therefore preferable to dilute it down from about 28% $SiO_2$ to about 2% to 4.5% silica, and to pass this diluted solution through the exchange column at a rate sufficient to enable practically complete removal of all the alkali metal present in the starting silicate. The resultant sol is acidic and therefore may be described as an acid silica sol.

The alkali stabilized silica sols are preferably produced by adding an alkaline material to an acid sol prepared as above described, e.g., by adding an alkali metal base such as sodium, potassium or lithium hydroxide, or an alkali metal silicate, or a volatile base such as ammonia, or a low molecular weight aliphatic amine having a basicity sufficient to adjust the pH to between 8 and 11.

The alkali stabilized sols just described may be referred to simply as stabilized sols. They are used as the initial material in the concentration process. These sols are capable of use only when the initial particle size of the colloidal silicic acid has grown in diameter so that a silica micelle is present to start the build-up process. A simple method of accomplishing this initial particle growth in the starting stabilized colloidal silica sols is merely to heat the sol to about the boiling point at which time the pH will increase, thereby indicating particle growth. The particle growth having been effected, it is then desirable to add to the stabilized sol the acid silica sol, preferably one which is completely free from alkali metal ions. Such a sol may be conveniently obtained by using the fresh effluent from the Bird cation exchange process previously described.

As previously indicated, it is preferable to add the acid sol to the alkaline sol in small increments with the evaporation of water taking place so that the liquid volume of the system remains constant. The evaporation can be conducted at room temperature or it can be conducted at elevated temperatures. Good results are afforded by using initially a stabilized sol which has been produced by boiling. At the time when steam vapors begin to appear and the pH is of sufficient magnitude to indicate initial particle growth the acid sol is added thereto at a rate sufficient to maintain the evaporating volume constant. The addition of acid sol is continued until the sol has reached a silica concentration such that the alkali metal initially present is sufficiently reduced to uniformly stabilize said sol for prolonged periods of time.

The stabilized alkaline sol used at the beginning of the process should preferably have a pH between 9.0 and 10.5. The pH will depend primarily upon the amount of alkali metal required for the finished sol as well as the type of basic substance used in the process. For instance, if an alkali metal base such as sodium hydroxide is used it is desirable to adjust the pH to about 9.5, initially, and then to concentrate the starting sol with the addition of a sol having a lower pH until the pH of the finished sol is about 8.5 to 9.0. At this time the concentration process is discontinued and the resultant sol is stable. If, on the other hand, the starting base used were ammonia, larger amounts of ammonia, giving the starting sol a higher pH, could be used since some of the ammonia is lost due to evaporation in the concentration process.

In the production of sols by the method of the invention it is readily seen that the pH of the sol will decrease with the increase of silica concentration.

In producing sols in accordance with the invention, the higher the silica concentration of the acid sol used, the more rapid is the concentration process. Accordingly, it is preferred to use in the concentration step an acid sol having a silica concentration of about 7%. The sols may be readily concentrated over a longer period of time, however, by using acid sols having silica concentrations of about 3.5% to 4.5% $SiO_2$.

The progress of particle size increase in the starting alkaline sol, as evidenced by a rise in pH, continues through a point whereby the particles become self stabilized. If, however, the excess of alkali is too great, then the growing particles may be forced into a state of cross-linkage which is manifested by irreversible gelation. The self-stabilization of the sols may be observed by carefully noting the viscosity of the aging sol. As the pH increases there is a proportionate increase in the viscosity of the sol. If self-stabilization occurs the viscosity reaches a maximum and then recedes to a point almost similar to the viscosity of the starting sol. If the sol contains too much alkali metal ion the viscosity will increase until gelation occurs. The self-stabilized sols are admirably suited as starting sols for the concentration process of this invention.

The best mode contemplated for the practice of the invention is illustrated by the following example.

*Example*

7100 gallons of a 3.5% by weight $SiO_2$ sol obtained as an effluent from the process described in Bird, U.S. Patent 2,244,325, was adjusted with sodium silicate to a pH of 8.5 and was evaporated by boiling in an evaporator to a specific gravity of 1.074 at which point it had a pH of 10.0 and a methyl orange alkalinity of 199 grains per gallon, expressed as $CaCO_3$. The weight ratio of $SiO_2:Na_2O$ at this stage was about 67:1 and the sol contained about 12.2% silica, as $SiO_2$.

While continuing to boil the resultant sol in the evaporator, 2990 gallons of acid sol containing about 3.5%

SiO$_2$ and having a pH of about 3, obtained as an effluent by passing a dilute sodium silicate solution through a column of Nalcite HCR in the hydrogen form (sulfonated styrene-divinylbenzene cation exchange resin as described in U.S. Patent No. 2,366,007), was added to the boiling sol gradually in proportions sufficient to maintain an approximately constant volume. After this addition the specific gravity of the sol was 1.114 which corresponds to an SiO$_2$ content of about 17%. The pH was 9.5–9.6 and the methyl orange alkalinity was 184 grains per gallon, expressed as CaCO$_3$.

With the evaporator still running, another 4050 gallons of the same acid sol was added gradually to the boiling sol while maintaining a substantially constant volume. After this addition the specific gravity of the resultant sol was 1.164, corresponding to about 24% SiO$_2$, the pH was 9.1 to 9.2 and the methyl orange alkalinity was about 166 grains per gallon, expressed as CaCO$_3$.

With the evaporator still running, an additional 4500 gallons of the acid sol was added to the boiling sol in increments sufficient to maintain a substantially constant volume. After this addition the specific gravity of the resultant sol was 1.215 which corresponds to about 31% SiO$_2$, the pH was 8.9–9.0 and the methyl orange alkalinity was about 148 grains per gallon, expressed as CaCO$_3$.

With the evaporator still running, an additional 4500 gallons of the acid sol were added to the boiling sol in increments sufficient to maintain a substantially constant volume. After this addition the specific gravity was 1.255, corresponding to about 36% SiO$_2$, the methyl orange alkalinity was 134 grains per gallon, expressed as CaCO$_3$, and the pH was 8.5 to 8.6.

In this manner a highly concentrated stable silica sol was obtained having the desired pH and requiring no further adjustment to preserve its stability.

In a similar manner, silica sols of varying concentrations can be prepared in accordance with the practice of the invention. While in the example sodium silicate was added initially to the acid sol in order to produce an alkali stabilized sol, it will be understood that the stabilization can also be effected by the addition of other alkaline materials as previously explained.

The acid sols which are added during the concentration process are relatively unstable but such sols can be prepared which are stable against gelation a sufficiently long period of time to be useful in the process. Their stability depends upon the silica concentration, the pH and the conductivity of the sol. The more dilute acid sols are more stable than the more concentrated sols.

The invention has the advantage that it makes it possible to increase the SiO$_2$ content of the sol while at the same time reducing the relative proportion of Na$_2$O as compared with the amount of silica. Thus, if the alkali stabilized sol were concentrated while adding additional quantities of alkali stabilized sol, additional quantities of Na$_2$O would also be added whereas in the present process this is avoided. The net effect is to permit a gradual adjustment of the pH while the silica sol is being concentrated and at the same time gradually reduce the amount of Na$_2$O as compared with the amount of SiO$_2$ so that a stable sol is obtained.

The invention is hereby claimed as follows:

1. A process for concentrating an aqueous silica sol which comprises boiling off water from an initial, alkaline silica sol having an initial pH of 9 to 10.5 and a silica to alkali oxide weight ratio, expressed as SiO$_2$:Na$_2$O, in the range of 50:1 to 130:1, and adding to said alkaline silica sol an aqueous, acidic silica sol having a pH between 2 and 5.5 and obtained as the effluent from the passage of an alkaline alkali metal-silica sol through an acid activated, cation exchanger, said effluent thereby being substantially free of alkali metal ions, said aqueous, acidic silica sol being the only composition added to said alkaline silica sol during the evaporation period, maintaining the additions of said aqueous, acidic silica sol to said alkaline silica sol at a rate maintained to gradually reduce the pH of the aqueous alkaline sol during the evaporation period, said rate being such that the alkaline sol being concentrated is maintained in an alkaline condition and whereby the SiO$_2$:Na$_2$O ratio gradually increases during the evaporation period, and, when the concentrated sol contains 18–48° by weight SiO$_2$, recovering the concentrated silica sol at an alkaline pH below the pH of said initial, dilute, alkaline silica sol.

2. A process as claimed in claim 1, wherein the recovered, concentrated silica sol has a pH between 8.5 and 9.

References Cited in the file of this patent

UNITED STATES PATENTS 2,577,484     Rule  ---------------- Dec. 4, 1951

UNITED STATES PATENT OFFICE

CERTIFICATION OF CORRECTION

Patent No. 2,929,790                  March 22, 1960

Raymond Reuter et al.

It is hereby certified that error appears in the above numbered patent requiring correction and that the said Letters Patent should read as corrected below.

In the grant, lines 1 and 2, and in the heading to the printed specification, line 4, name of second inventor, for "Alfred J. Tozyldo", each occurrence, read -- Alfred J. Tozydlo --; column 6, line 37, for "18-48°" read -- 18-48% --.

Signed and sealed this 25th day of April 1961.

(SEAL)
Attest:

ERNEST W. SWIDER
Attesting Officer

DAVID L. LADD
Commissioner of Patents